United States Patent [19]

Chautemps

[11] Patent Number: 4,706,123
[45] Date of Patent: Nov. 10, 1987

[54] PHOTOSENSITIVE DEVICE WITH LOCALLY ADJUSTABLE EXPOSURE TIME

[75] Inventor: Jacques Chautemps, St. Egreve, France

[73] Assignee: Thomson CSF, Paris, France

[21] Appl. No.: 848,476

[22] Filed: Apr. 7, 1986

[30] Foreign Application Priority Data

Apr. 5, 1985 [FR] France ................. 85 05254

[51] Int. Cl.⁴ .................. H04N 3/14; H04N 5/235
[52] U.S. Cl. .................. 358/213.19; 358/213.29; 358/228; 358/294
[58] Field of Search ........... 358/294, 212, 213, 228

[56] References Cited

U.S. PATENT DOCUMENTS

| | | | |
|---|---|---|---|
| 4,363,963 | 12/1982 | Ando | 358/213 |
| 4,446,479 | 5/1984 | Kurtz | 358/294 |
| 4,531,156 | 7/1985 | Nishizawa et al. | 358/213 |
| 4,612,578 | 9/1986 | Breithaupt | 358/212 |

*Primary Examiner*—Gene Z. Rubinson
*Assistant Examiner*—Stephen Brinich
*Attorney, Agent, or Firm*—Cushman, Darby & Cushman

[57] ABSTRACT

The invention provides a photosensitive device with locally adjustable exposure time, wherein means provide local modification of the integration time, for some detectors, as a function of the lighting received by each detector. In FIG. 1, these means are formed by a shift register with a series input and parallel outputs, by MOS transistors and by charge removal diodes.

10 Claims, 27 Drawing Figures

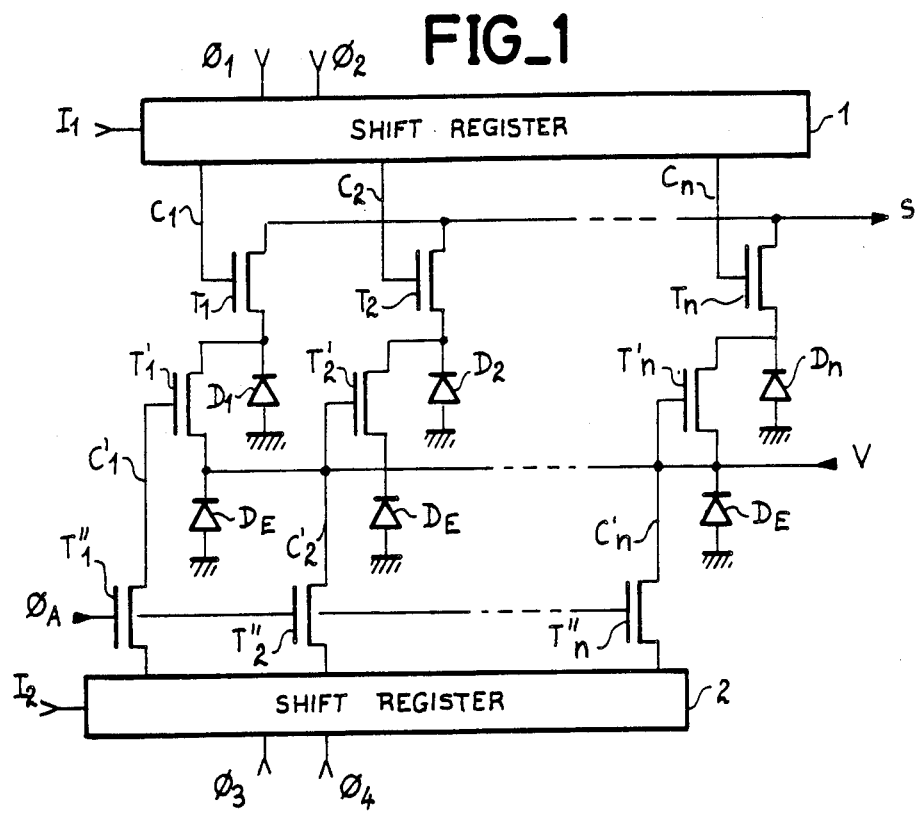
FIG_1
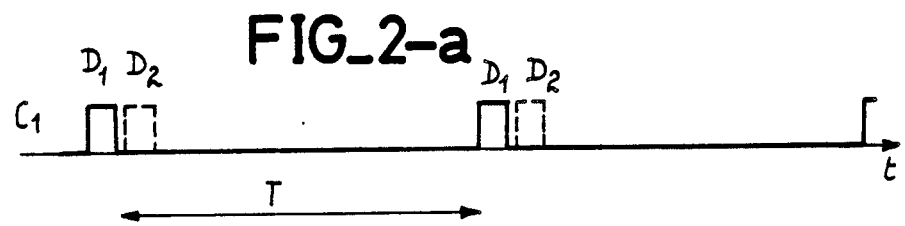
FIG_2-a
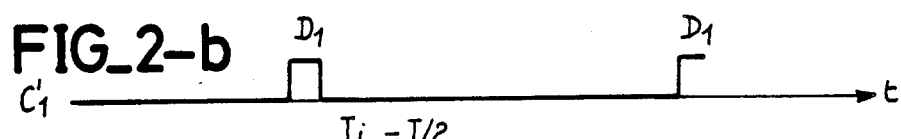
FIG_2-b
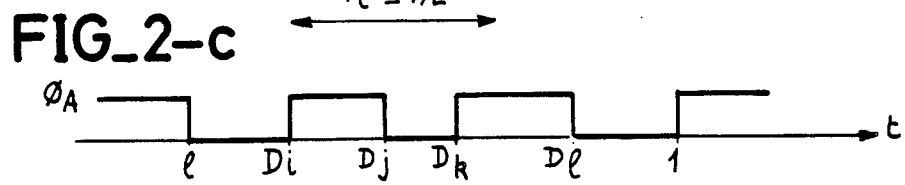
FIG_2-c

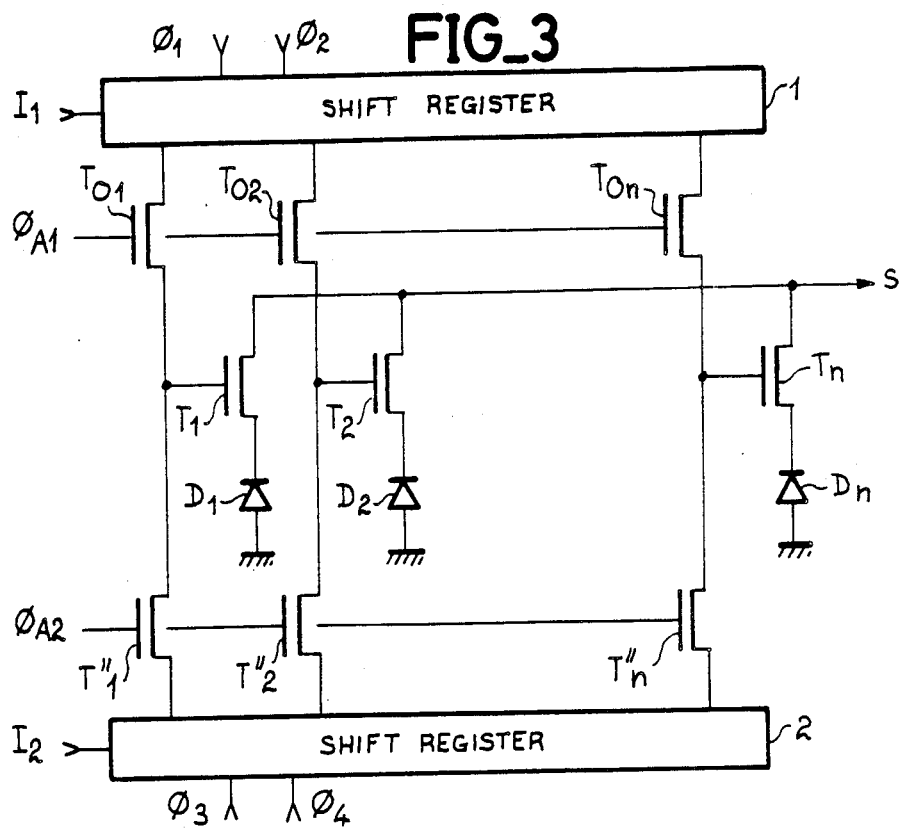
FIG_3
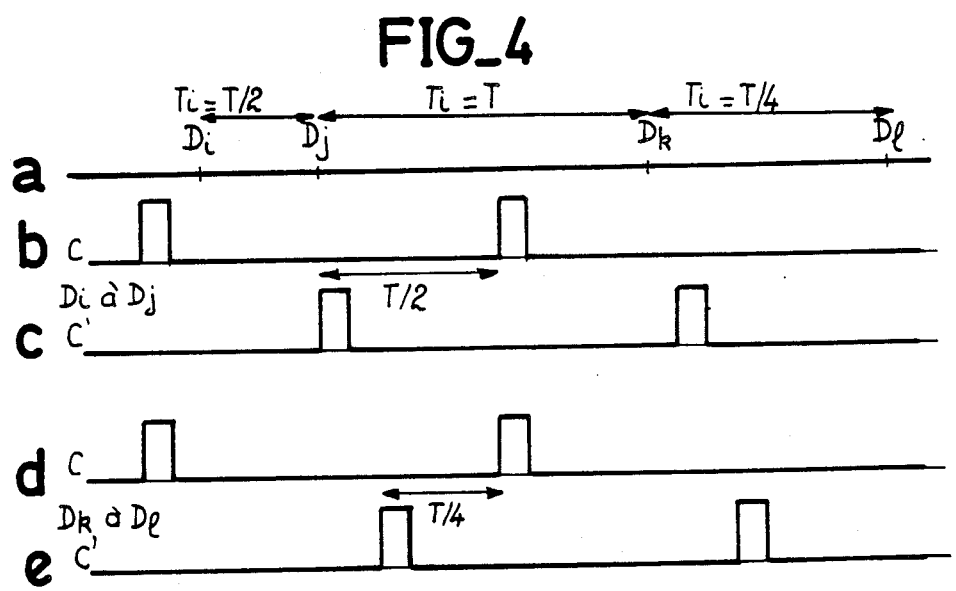
FIG_4

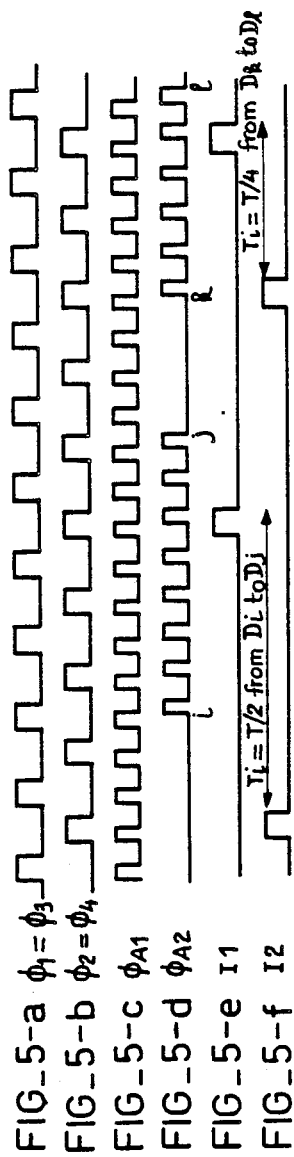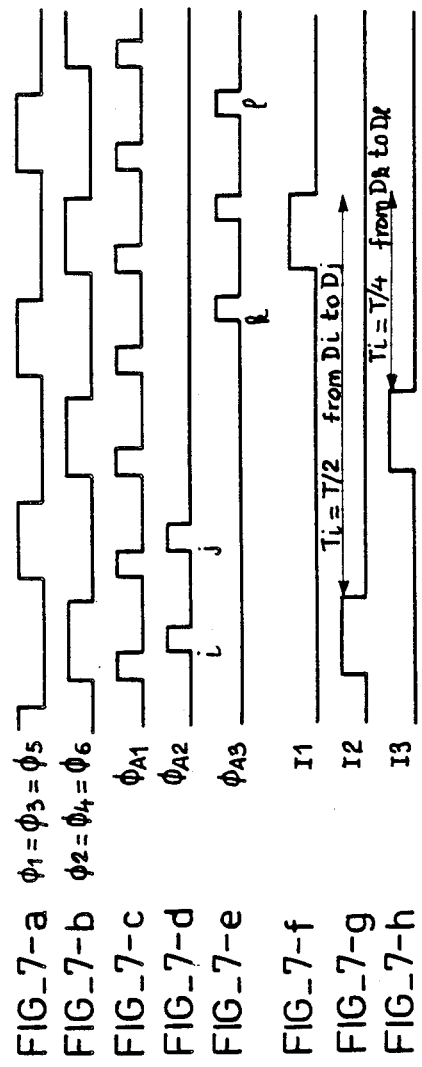

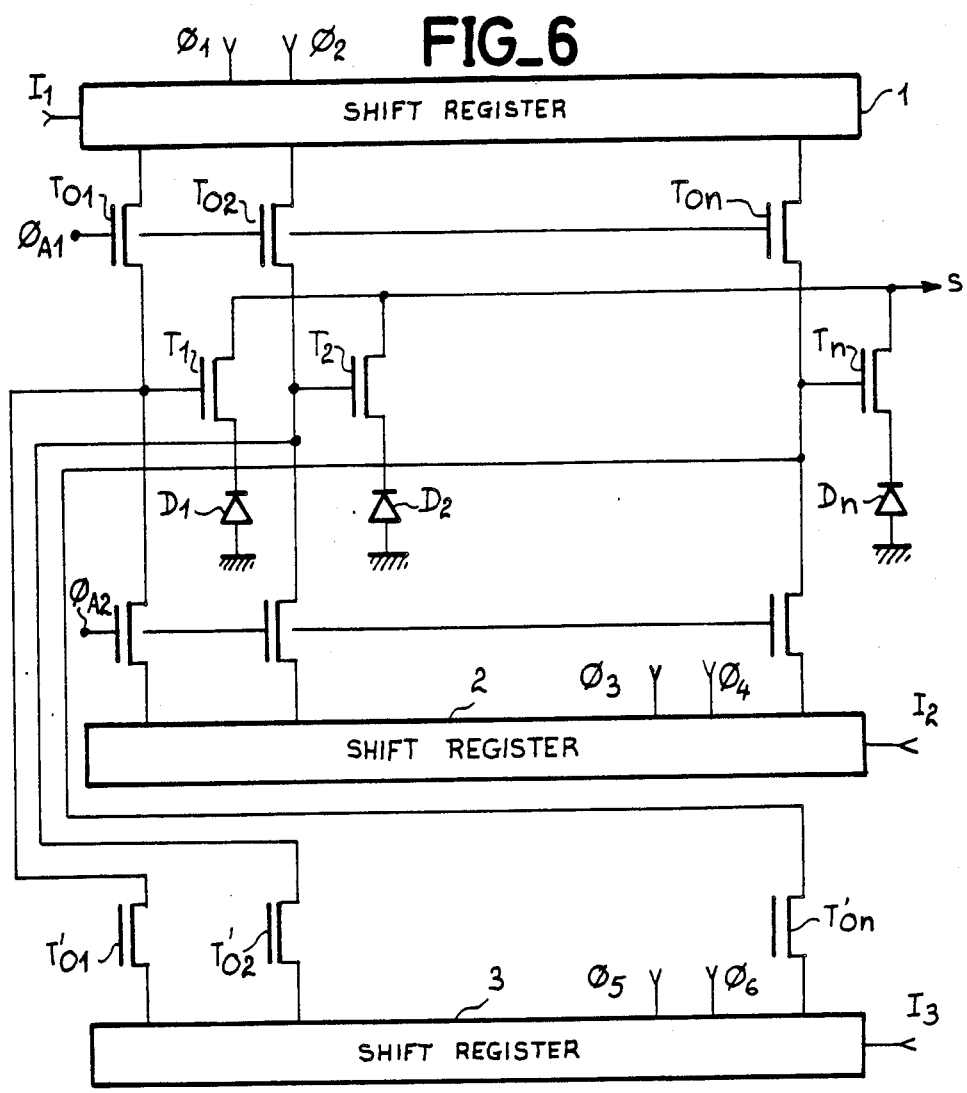
FIG_6
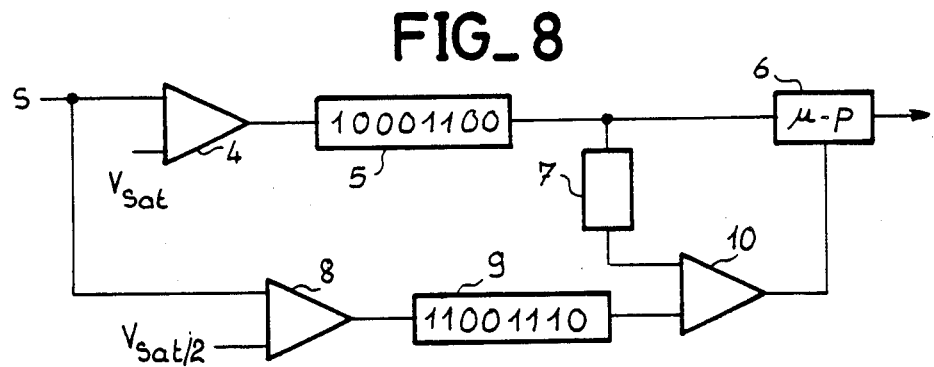
FIG_8

PHOTOSENSITIVE DEVICE WITH LOCALLY ADJUSTABLE EXPOSURE TIME

BACKGROUND OF THE INVENTION

1. Field of the Invention

The present invention relates to a photosensitive device with a locally adjustable exposure time.

2. Description of the Prior Art

Photosensitive devices of the prior art are known whose exposure time is adjustable as a whole for the whole of the device. This is the case for example of the device described in the American U.S. Pat. No. 4,553,168.

These devices do not give entire satisfaction in numerous applications where the scenes analyzed comprise a high lighting dynamics.

This is the case for example when analyzing a landscape against the light or an opaque object against a light background.

In general either the light zone or the dark zone is favored, which causes a part of the information of the other zone to be lost.

For example, if the diaphragm of the lens is opened for analyzing a dark zone, the light zone then becomes saturated. The use of an anti-blooming device does not remove this problem, for, by clipping, it causes the loss of a part of the information corresponding to the light zone.

If on the other hand, the diaphragm is closed for analyzing a very light zone, the information from the dark zone is partially unusable.

SUMMARY OF THE INVENTION

The present invention overcomes the above mentioned problems and provides a photosensitive device comprising at least one line of photosensitive detectors, and further comprising means providing local modification of the integration time, for certain detectors, depending on the lighting received by each detector.

BRIEF DESCRIPTION OF THE DRAWINGS

Other objects, features and results of the invention will be clear from the following description, given by way of non limitative example and illustrated by the accomanying Figures which show:

FIGS. 1, 3 and 6 three embodiments of photosensitive devices in accordance with the invention;

FIGS. 2a, b and c, 4a, to e, 5a to f, and 7a to h control signals for the devices of FIGS. 1, 3 and 6; and FIG. 8, one embodiment of the control circuit for the devices of FIGS. 1, 3 and 6.

In the different Figures, the same references designate the same elements but, for the sake of clarity, the sizes and proportions of the different elements have not been respected.

DESCRIPTION OF THE PREFERRED EMBODIMENTS

FIG. 1 relates to one embodiment of a photosensitive device in accordance with the invention.

In the embodiment of FIG. 1, a strip of photosensitive detectors has been shown which comprises only a single line of detectors $D_1$ to $D_n$, photodiodes for example.

A shift register 1, with series input and parallel outputs allows each detector to be addressed sequentially. It may for example be a logic shift register which operates with two clock signals $\emptyset_1$ and $\emptyset_2$. Into this register is fed a pulse $I_1$ which is transferred from one output of the register to the next with period T.

In the embodiment shown in FIG. 1, each output of the register addresses the gate of an MOS transistor, referenced $T_1, T_2, \ldots T_n$.

A second electrode of these MOS transistors is connected to a detector, whereas their third electrode forms the output S of the device.

This output S allows the charge amount to be read which is stored by each detector addressed. This charge amount is proportional to the lighting received during the integration time.

Each detector is further connected to means providing local modification of the integration time, which are formed by MOS transistors $T'_1, T'_2 \ldots T'_n$ connected by one of their electrodes to a detector $D_1, D_2 \ldots D_n$, by another electrode to a charge removal diode $D_E$ biased at a constant potential V. The gate of the MOS transistors $T'_1$ to $T'_n$ is controlled by an electrode of the MOS transistors $T''_1$ to $T''_n$, whose gates receive the same control signal $\emptyset_1$ and another electrode of which is connected to an output of the second shift register 2. This shift register, with series input and parallel outputs, is controlled by clock signals $\emptyset_3$ and $\emptyset_4$ and receives at its input information $I_2$ which is conveyed from one output of the register to the next.

The operation of the device of FIG. 1 is as follows.

Register 1 operates at a frequency such that the reading period of the detectors equals T. In FIG. 2a, the control signal $C_1$ received by the gate of transistor $T_1$ is shown. This signal $C_1$ is periodic, with period T. It is therefore with a period T that the charges stored by detector $D_1$ are removed to the output S after passing through the MOS transistor $T_1$.

The control signal $C_2$ applied to transistor $T_2$ connected to detector $D_2$ is shown with broken lines in FIG. 2a. It is shifted slightly in time with respect to the signal $C_1$.

In FIG. 2b, there is shown the control signal $C'_1$ applied to transistor $T'_1$ also connected to the detector $D_1$.

In the example of FIGS. 2a, b and c, register 2 operates at the same frequency as register 1 but the information $I_2$ is offset by T/2 with respect to the information $I_1$. The exposure time, i.e. the integration time $T_i$ of detector $D_1$, is then equal to T/2.

After a time equal to T/2, the charges stored in detector $D_1$ are removed to a diode $D_E$ brought to potential V. These are then the charges stored during an integration time equal to T/2 which will be read at the output S. The signal $\emptyset_A$ is brought to the high level for transmitting the signal $C'_1$ at the right time.

In FIG. 2c there has been shown by way of example the signal $\emptyset_A$ at the high level whereas the pulse $I_2$ is opposite detectors $D_1$ to $D_j$ and detectors $D_k$ to $D_l$. The integration time is therefore divided by two only for those detectors and not for detectors $D_j$ to $D_k$. Thus a locally adjustable exposure time is provided for groups of detectors.

It is possible, when all the detectors have been read, to bring them back to the same potential by applying this potential to the connection of output S between operations for addressing register 1.

In FIG. 3, an embodiment has been shown slightly different from that of FIG. 1.

In this embodiment, the MOS transistors $T_1, T_2 \ldots T_n$ which control the detectors $D_1$ to $D_n$ may be addressed by one or other of the registers 1 and 2, through MOS transistors $T_{o1}$ to $T_{on}$ and $T''_1$ to $T''_n$ which recieve the control signals $\phi_{A1}$ and $\phi_{A2}$ respectively at their gates.

At the output connecton S an alternation is found of useful and useless information. In fact, when a detector is connected to connection S it is either in order to be read or for removing the charges which it has stored so as to begin a new integration period.

The control signals $\phi_{A1}$ and $\phi_{A2}$ are substantially in phase opposition. As in the case shown in FIG. 1, in order to obtain for some detectors an integration time equal to T/2, signals $\phi_1$, $\phi_2$, $\phi_3$ and $\phi_4$ of the same period may be used and information $I_1$ and $I_2$ offset by T/2.

With respect to that shown in FIG. 1, the device shown in FIG. 3 has the advantage of using the same path for removing the parasite charges and for removing the signal charges, which reduces the space noise.

With the devices shown in FIGS. 1 and 3 several different integration times may be obtained.

For example, if the detectors $D_i$ to $D_j$ receive twice too much light, that is to say about twice the saturation level and if detectors $D_k$ to $D_l$ receive four times too much light, it is desirable to obtain an integration time of T/2 for detectors $D_i$ to $D_j$, and T/4 for the detectors $D_k$ to $D_l$, whereas the integration time remains equal to T for the other detectors.

In FIG. 4a, the different groups of detectors have been shown symbolically with their integration times: $T_i=T/2$ for the detectors $D_i$ to $D_j$, $T_i=T$ for the detectors $D_j$ to $D_k$ and $T_i=T/4$ for the detectors $D_k$ to $D_l$.

In FIGS. 4b to 4e there have been shown, taking for example the embodiment of FIG. 1, the control signals C and C' applied to the detectors $D_i$ to $D_j$ and $D_k$ to $D_l$ so as to have the desired integration times. In so far as detectors $D_j$ and $D_k$ are concerned whose integration time is equal to T, it is sufficient to place signal $\phi_A$ at the low level.

In order to obtain the integration times T/2 and T/4 it is possible to modify the period of the clock signals $\phi_3$ and $\phi_4$ of register 2.

Thus, for example, between the detectors $D_j$ and $D_k$ the clock signals $\phi_3$ and $\phi_4$ may be stopped. After detector $D_1$, the information $I_2$ is transferred very rapidly in register 2 so as to come back to an integration time of T/2 for detector $D_i$.

The detectors $D_1$ and $D_i$ cannot be closely related if it is desired to go over from an integration time of T/4 to an integration time of T/2.

The minimum distance, in the number of detectors, between detectors 1 and i equals:

$$n.(T/4+n.t_{min}).1/T$$

where n is the total number of detectors and where $t_{min}$ is the minimum time for transferring the information $I_2$ from one stage of register 2 to the next.

In FIGS. 5a to f, an embodiment has been shown of the signals which may be used, in the embodiment of FIG. 3, to obtain an integration time $T_i=T/2$ for detectors $D_i$ to $D_j$, $T_i=T$ for detectors $D_j$ to $D_k$ and $T_i=T/4$ for detectors $D_k$ to $D_l$.

Signal $\phi_1$ is identical to signal $\phi_3$ and signal $\phi_2$ is identical to signal $\phi_4$. FIG. 5a shows the signals $\phi_1$ and $\phi_3$ and FIG. 5b, the signals $\phi_2$ and $\phi_4$. Signals $\phi_1$ and $\phi_3$ are substantially in phase opposition with signals $\phi_2$ and $\phi_4$.

In FIGS. 5c and 5d, control signals $\phi_{A1}$ and $\phi_{A2}$ are shown with are substantially in phase opposition, when the pulse $I_2$ is opposite detectors $D_i$ to $D_j$ and $D_k$ to $D_l$.

When the pulse $I_2$ is opposite detectors $D_j$ to $D_k$, signal $\phi_{A2}$ is at a low level. For detectors $D_j$ to $D_k$, integration time is equal to T.

In FIGS. 5e and f, informations $I_1$ and $I_2$ have been shown. They are shifted of T/2, when detectors $D_i$ to $D_j$ are treated, and are shifted T/4, when detectors $D_k$ to $D_l$ are shifted.

Another possibility for obtaining the integration time T/2 and T/4 is to use a third shift register 3 as is shown in FIG. 6, in the case of the embodiment of FIG. 3. This register 3 receives information $I_3$ and clock signals $\phi_5$ and $\phi_6$. MOS transfers $T'_{01}$ to $T'_{0n}$ connect the outputs of this register to the control means of the MOS transistor $T_1$ to $T_n$.

In the same way a third register 3 may be used in the case of the device shown in FIG. 1. This third register is connected to the device in the same way as the second shift register 2.

FIGS. 7a to h show control signals which may be used in the embodiment of FIG. 6.

Signals $\phi_1$, $\phi_3$ and $\phi_5$, shown in FIG. 7a, are identical. It is the same for signals $\phi_2$, $\phi_4$ and $\phi_6$ shown in FIG. 7b. Signals $\phi_1$, $\phi_3$ and $\phi_5$ are substantially in phase opposition with signals $\phi_2$, $\phi_4$ and $\phi_6$.

In FIGS. 7c, d and e, signals $\phi_{A1}$, $\phi_{A2}$ and $\phi_{A3}$ have been shown.

During treatment of detectors $D_i$ to $D_j$, signals $\phi_{A1}$ and $\phi_{A2}$ are substantially in phase opposition.

Signal $\phi_{A2}$ is at a low level during treatment of the other detectors.

It is the same for signals $\phi_{A1}$ and $\phi_{A3}$ which are substantially in phase opposition during treatment of detectors $D_k$ to $D_1$. Signal $\phi_{A3}$ is at a low level during treatment of the other detectors.

Consequently, detectors $D_j$ to $D_k$, have a time equal to T, because signals $\phi_{A2}$ and $\phi_{A3}$ are at a low level during treatment of these detectors.

In FIGS. 7f, g and h, informations $I_1$, $I_2$ and $I_3$ have been shown.

Informations $I_1$ and $I_2$ are shifted of T/2 when detectors $D_i$ to $D_j$ are treated and informations $I_1$ and $I_3$ are shifted of T/4 when detectors $D_k$ to $D_1$ are treated.

Consequently, detectors $D_i$ to $D_j$ have a time integration equal to T/2, detectors $D_k$ to $D_1$ have a time integration equal to T/2 and detectors $D_k$ to $D_1$ have a time integration equal to T/4.

In FIG. 8 an embodikment has been shown of the control circuit for the devices of FIGS. 1, 3 and 5.

The output signal S is compared for each detector with saturation threshold $V_{sat}$ using a differential amplifier 4 for example.

A 1 is attributed for example if S is greater than $V_{sat}$ and a 0 in the opposite case.

The result of these comparisons is stored in a memory 5.

The output of this memory 5 is connected to a microprocessor 6 which controls the signals $\phi_1$ and $\phi_2$, $\phi_3$, $\phi_4$ . . . and the informations $I_1$, $I_2$ . . . transferred into the registers.

For the detectors to which a 1 is attributed, the integration time passes to T/2.

The result of the comparisons between the signals S and $V_{sat}$ is also stored in another memory 7.

From this first reading of the output signal S, a differential amplifier 8 compares the output signal S with $V_{sat}/2$. This comparison is only used from the second reading. The result of such a comparison is stored in memory 9. A 1 may for example be attributed if the signal S is less than $V_{sat}/2$ and a 0 in the opposite case.

A third differential amplifier 10 has its inputs connected to the memories 7 and 9 and its output to the microprocessor 6.

During the second reading of the output signal S of the detectors, the output signal S of the detectors whose integration time was previously brought to T/2 is examined to see how it is placed:

if their output signal S is still greater than $V_{sat}$, their integration time becomes equal to T/4;

if their output signal S has become less than $V_{sat}/2$, their integration time becomes equal to T.

More elaborate control circuits may of course be designed in which other reference voltages are used for example $V_{sat}/4$, $3V_{sat}/4$ ... and other integration times for example T/4, 3T/4 ...

The device of the invention has been described in the case of detector strips. They may for example be formed by photodiodes or MOS photosensitive devices. The invention is of course applicable in the case of photosensitive matrices formed of several lines of detectors.

In such a case each line of the matrix may be processed like a detector strip or the lines may be processed as a whole.

What is claimed is:

1. A photosensitive device comprising at least one line of photosensitive detectors, and further comprising means providing local modification of the integration time, of some detectors, as a function of the lighting received by each detector.

2. The device as claimed in claim 1, comprising a shift register with a series input and parallel outputs which are connected to the detectors of each line of detectors through MOS transistors.

3. The device as claimed in claim 2, wherein each MOS transistor has its gate connected to an output of the register and is further connected to a detector and to the output of the device.

4. The device as claimed in claim 3, wherein the means providing local modification of the integration time are formed by a second shift register with a series input and parallel outputs, whose outputs control an electrode of a series of MOS transistors whose gates receive the same control signal and another electrode of which controls the gates of another series of MOS transistors, which are connected to a detector and to a charge removal diode brought to a constant potential.

5. The device as claimed in claim 2, wherein a first series of MOS transistors is connected between the detectors and the output of the device, and a second series of MOS transistors is connected between each output of the register and the gate of an MOS transistor of the first series, each MOS transistor of the second series receiving at its gate a same control signal and the means for providing a local modification of the integration time are formed by a second shift register with a series input and parallel outputs, and by a third series of MOS transistors, each MOS transistor of the third series being connected between one of the outputs of the second register and a gate of an MOS transistor of the first series, and each MOS transistor of the third series receiving at its gate a same control signal.

6. The device as claimed in claim 4, wherein the means providing local modification of the integration time comprise a shift register, with a series input and parallel outputs, connected to the device in the same way as the second shift register.

7. The device as claimed in claim 4, wherein the second shift register of the means providing local modification of the integration time is controlled by a control circuit which determines the integration time of each detector by comparing its output signal with a reference signal.

8. The device as claimed in claim 6, wherein the second and/or third shift registers of the means providing local modification of the integration time are controlled by a control circuit which determines the intergration time of each detector by comparing its output signal with a reference signal.

9. The device as claimed in claim 7, wherein the reference signal is a function of the saturation level of the detectors.

10. The device as claimed in claim 8, wherein the reference signal is a function of the saturation level of the detectors.

* * * * *